United States Patent
Duba et al.

[15] 3,672,311
[45] June 27, 1972

[54] MOVABLE STAIR MOUNTING ARRANGEMENT FOR VEHICLES

[72] Inventors: Erwin Duba, Salzgitter-Bad; Conrad Fischer, Salzgitter-Lebanstedt, both of Germany

[73] Assignee: Linke-Hofmann-Busch Waggon-Fahrzeug-Maschinen GmbH, Salzgitter-Watenstedt, Germany

[22] Filed: July 27, 1970

[21] Appl. No.: 58,555

[52] U.S. Cl. ............................... 105/447, 182/88, 280/166
[51] Int. Cl. ............................................. B61d 23/02
[58] Field of Search ................. 105/443, 446, 447, 444, 448; 280/166; 182/88

[56] References Cited

UNITED STATES PATENTS

| | | | |
|---|---|---|---|
| 403,237 | 5/1889 | Wood et al. | 105/449 |
| 1,449,031 | 3/1923 | Blake | 280/166 |
| 1,618,386 | 2/1927 | Poole | 105/449 |
| 1,109,224 | 9/1914 | Herrin | 105/445 |
| 999,653 | 8/1911 | Jones | 105/449 |

*Primary Examiner*—Arthur L. La Point
*Assistant Examiner*—Richard A. Bertsch
*Attorney*—McGlew and Toren

[57] ABSTRACT

A mounting arrangement for a movable step of a multi-step entry for a vehicle, particularly for rail vehicles, includes a movable step member having a flat outwardly extending platform portion and an oblique inner end portion which rides in an oblique groove to permit the step to be shifted between an upward position at which the platform is level with the entrance way and a lower position in which it is slightly above a lower entrance step of the entry. The construction includes a mounting for a running roller which facilitates the running upward and downward movement of the guide for the step and a mounting for a support roller. The support roller is pivotally mounted on a bracket of the guide and it may be biased into engagement with the wall bounding the guide way for controlling the movement of the step. An apron is pivoted to the front end of the step platform and it includes a bracket having a roller which extends into a guideway so as to shift the apron inwardly and outwardly during the downward and upward movement of the platform. In this manner the apron closes the space between the platform and the bottom of the cut out entry of the vehicle.

12 Claims, 11 Drawing Figures

INVENTORS
ERWIN DUBA
CONRAD FISCHER

BY McGlew & Toren
ATTORNEYS

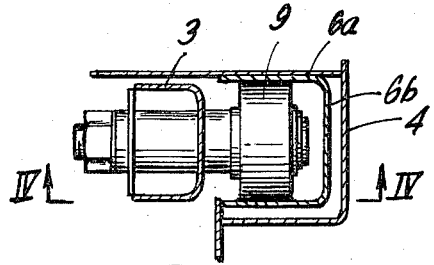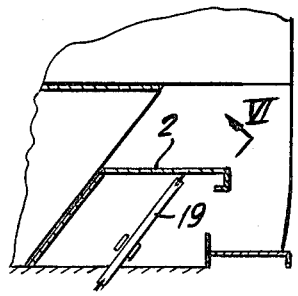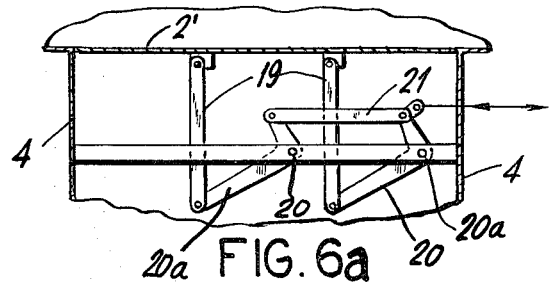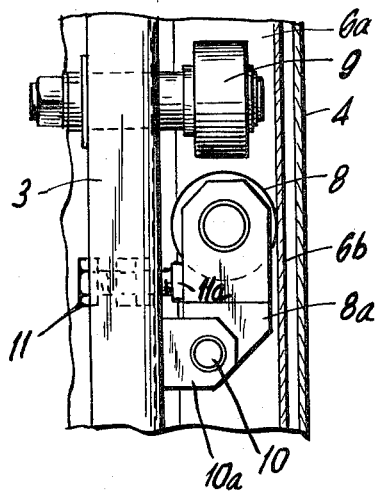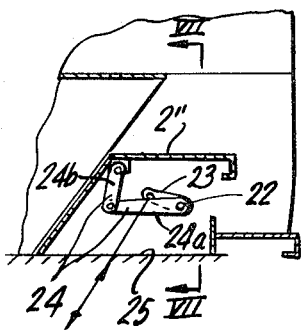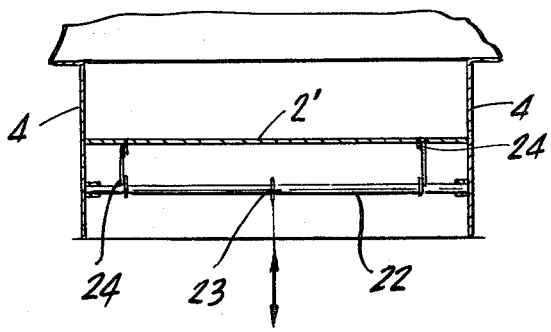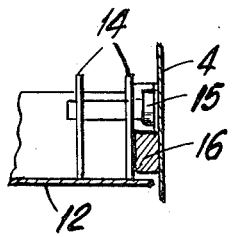

MOVABLE STAIR MOUNTING ARRANGEMENT FOR VEHICLES

SUMMARY OF THE INVENTION

This invention relates in general to the construction of entrance ways and in particular, to a new and useful multi-step entrance, particularly for a vehicle entry way which includes a movable step which may be raised and lowered in respect to the entrance floor; and which is guided by an obliquely extending guide portion of the step which carries running rollers and supporting rollers, and which also includes an apron which is shiftable by movement of the step to form a closure wall at the bottom of the shiftable step platform.

The present invention which is particularly applicable for use on rail vehicles includes a fixed lower step and an entrance floor which is at a greater height than the lower step. The invention relates to the mounting and operation of a movable step which is movable between the fixed entry step and the entrance floor in order to provide a bridging for different entry heights. In order to compensate for different heights of platform edges at the stops of the vehicles, multi-step entries have become known. One step of the entry is movable or hinged so as to form a part of the floor so that it may be swung down to define an intermediate step. By constructing the steps so that it is mounted by a single pivotal mounting, the face of the step serves as a tread area in the normal position and its side wall in the swung down position. When the step is moved back into a normal position from the swung down position it will bring back contaminations such as snow, ice, etc. which may be dumped onto the actuating mechanism which is located therebeneath and thus cause it to fail or to wear prematurely. In addition, in the normal position the portion of the floor formed by the step can either not be utilized at all or it can not be pivoted.

In accordance with the present invention the disadvantages of the known construction are overcome by creating an entry which provides a step which is shiftable between a normal elevated position at which it is level with the entrance floor and a downward intermediate position at which it is guided downwardly. In the normal position it can provide an area for standing room, and the construction is such that the supporting platform area, or tread area, is the same in all positions. The construction includes a step having a horizontally extending platform portion and an inner obliquely extending guide portion. The guide portion carries a set of running rollers and a set of supporting rollers, one set being adjustable in respect to its running engagement with the associated guideway defined at each end of the entrance to the vehicle. The step is movable between the upper normal position and the retracted lower position by means of a fluid actuated or electrically operated cylinder and piston member, and the front portion of the platform carries an apron which will be moved by the operating mechanism into a position closing off the interior space beneath the platform.

Accordingly, it is an object of the invention to provide an improved multi-step entry which includes a movable step member having an obliquely extending guide portion with a portion such as a roller engaged in a side guideway of the entrance to facilitate the even up and down movement of the horizontal platform portion and which also includes an apron which is articulated to the platform portion and forms a protection beneath the platform portion.

A further object of the invention is to provide a movable step for an entrance way which includes an obliquely extending guideway having at least one set of rollers comprising a supporting roller and a guide roller, at least one of which is adjustably positioned and may be set to bear against the associated guideway and which includes an operating mechanism in the form of a relatively movable piston and cylinder which may be directly connected or connected through various linkage arrangements to the movable step for moving it upwardly and downwardly.

A further object of the invention is to provide a multi-step entry which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 3 is a section taken along the line III—III of FIG. 1a on an enlarged scale; and FIG. 4 is a section taken along the line IV—IV of FIG. 3;

FIG. 5 is a section taken along the line V—V of FIG. 1a and on an enlarged scale;

FIG. 6 is a view similar to FIG. 1a of another embodiment of the invention;

FIG. 6a is a section taken on the line VI—VI of FIG. 6;

FIG. 7 is a view similar to FIG. 1 of still another embodiment of the invention; and FIG. 7a is a section taken along the line VII—VII of FIG. 7.

GENERAL DESCRIPTION OF THE PREFERRED EMBODIMENTS

Figure 1:
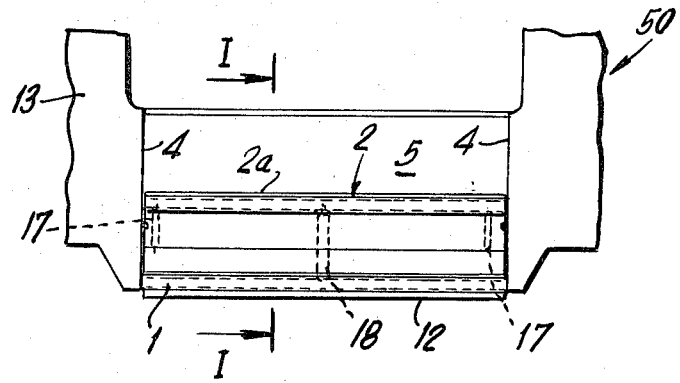
FIG. 1 is a partial front elevational view of a rail vehicle entranceway having a movable step constructed in accordance with the invention.

Referring to the drawings in particular, the invention embodied therein in FIGS. 1 to 5 comprises a rail vehicle generally designated 50 having side walls 13 which are interrupted to define an entrance way or cut out 5 having inwardly extending end wall portions 4, 4. The cut out portion 5 leads to an entrance floor or entrance way 7 and the outer lower end of the cut out portion includes a lowermost step 1 formed as part of the vehicle body.

Figure 1A:
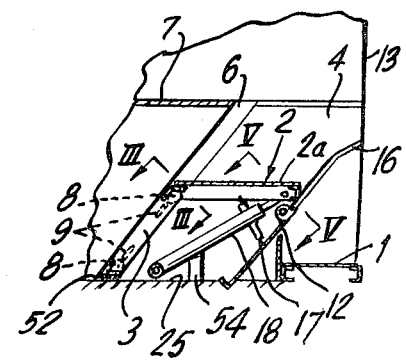
FIG. 1a is a section taken along the lineI—I of FIG. 1.
Figure 2:
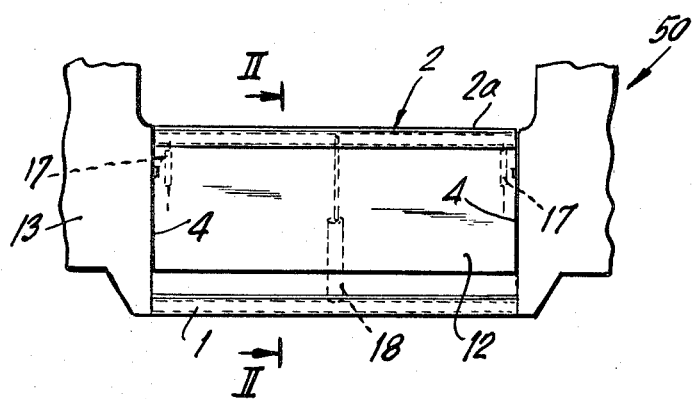
FIG. 2 is a view similar to FIG. 1 but showing the step in an elevated normal position.
Figure 2A:
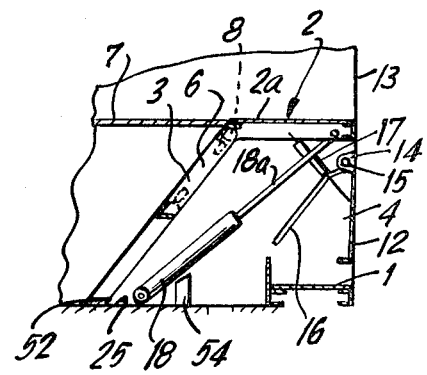
FIG. 2a is a section taken along the line II—II of FIG. 2.

In accordance with the invention in order to reach the distance between the outer fixed step 1 and the floor 7 there is provided an intermediate step 2 which may be shifted between a lower intermediate position indicated in FIG. 1a and an upper normal position indicated in FIG. 2a. The step 2 includes a top platform portion or tread 2a and an oblique or inclined guide portion or arm 3. The side walls 4 carry slots or trackways 6 which extend obliquely at the same angle as the guides 3 and their upper ends are located at the same level as the floor 7. In accordance with a feature of the invention, the arms 3 are guided in the tracks 6 by support rollers 8 and by running rollers 9. In the embodiment illustrated two pairs of support rollers 8 and guide rollers 9 are arranged at each end of the guide 3. As indicated in FIGS. 3 and 4, the running rollers 9 rest against a flange 6a and the support rollers 8 run against the web 6b of the U-shaped track 6. The support rollers 8 are carried on arms 8a which are carried on shafts 10 which are pivoted on brackets 10a of the guide 3. A set screw 11 may be threaded into the guide to cause a portion 11a to bear against the bracket 8a for the purpose of compensating for assembly inaccuracies in presetting the roller 8 against its associated web or trackway 6b.

In accordance with another feature of the invention, an apron 12 is articulated to the front end of the step 2 and it depends downwardly therefrom and is oriented in the plane of the side wall 13 when the platform 2a is in the normal position indicated in FIG. 2a. In this position, the apron 12 covers the cut out area 5 below the platform 2a. In order to free the cut out 5 when the platform is low the apron 12 is provided with guide means in the form of a roller 15 carried on legs 14 which are adjacent each side wall 4. A curved track 16 is fastened to each of the side walls 4 and provides a guide for the rollers 15 so that when the step 2 is lowered the apron 12 is swung inwardly against the force of spring legs 17 which are clamped on both sides between the apron 12 and the step 2.

Means are provided to raise and lower the step which may comprise a fluid pressure operated or an electrically operated cylinder 18 which is either linked or connected directly to the step 2. In the embodiment of FIGS. 1a and 2a, the cylinder 18 includes a piston rod 18a which is connected directly to the underside of the step platform 2a. In the FIG. 6a embodiment, a lever linkage is adapted to be connected through an actuating rod member 21 of the linkage and the piston rod 18a of the cylinder 18. The linkage comprises 2 link elements 19 which are linked to the underside of a step 2' and which have outer free ends which are linked to an angular lever 20. The levers 20 pivot about a fixed point of the car body at 20a, 20a and they are connected at their other ends to the rods 21. When the power source acts upon the rod 21 to raise or lower the step 2', it is done simultaneously and uniformly by the linkage mechanism.

In the embodiment indicated in FIGS. 7 and 7a, a shaft 22 is rotatably mounted within the side walls 4 and a steerer or crank member 23 is affixed thereto for rotation therewith. The power actuating means, in the form of a piston rod of a cylinder 18, is connected to the crank lever 23 to rotate the shaft 22 and to cause rotation of a linkage generally designated 24. The linkage 24 includes a linkage member 24a which is rotatably affixed to the shaft 22 and a linkage arm member 24b which is articulated to the end of the linkage arm member 24a and to the step 2''. In each of these variations of FIGS. 6 and 7, the guidance of the steps 2' and 2'' is the same as that indicated in the first embodiment.

A feature of the invention is that in the normal position of the step as indicated in FIGS. 2 and 2a, it forms one plane with the floor 7 and is so dimensioned so that it covers the upper area of the cut out 5. The step 2 is fixed in this position by the lifting cylinder 18 which is connected in the area of the front end of the platform 2a and also by the obliquely extending guide 3 at the rear end of the platform. The lifting cylinder 18 is advantageously designed so that the step may be loaded by passengers. In this normal position, the cut out area 5 below the step is closed off by the apron 12 which is kept in this position by the spring leg 17.

For entry from a low platform at the exterior of the train, the piston rod 18a is retracted and the step thus is lowered downwardly and backwardly while the platform 2a is maintained at and in its horizontal attitude. When it reaches a position between the step 1 and the floor 7, the piston rod 18a and the track 3 come to rest against a fixed stop 52 and 54 respectively. Simultaneously with the lowering of the step 2, the apron 12 is swung inwardly because of the engagement of the rollers 15 on the curved track 16 until the apron 12 is positioned behind the step 1 to thus keep the entry area above the step 1 free. In all positions, the lifting cylinder 18 and the lever linkages when present are closed off by the apron 12 and the step 2. The step and the apron also enclose the bottom 25 and the rear wall of the cut out 5. The gap between the step and the apron 12 is closed by a strip 27 at the rear end of the fixed step 1.

What is claimed is:

1. A multi-step entry particularly for rail vehicles having a fixed outer step lower than the entrance floor of the vehicle, comprising a movable step having a top normally horizontal platform portion and an obliquely extending guide portion, guide means associated with the entry extending obliquely alongside said guide portion engageable with said guide portion for guiding said step between an upper position at which said platform is level with said floor and a lower position between said floor and said fixed step and not laterally therebeyond, and means connected to said movable step for moving said movable step upwardly and downwardly between the floor and the outer fixed step.

2. A multi-step entry, according to claim 1, including a railway car having an entrance way with a side wall at each end, said guide means comprising a guide track on each of said side walls extending obliquely downwardly and upwardly from said floor toward and extending substantially parallel to said guide portion of said step.

3. A multi-step entry, according to claim 1, wherein said guide track includes at least two wall portions and said guide portion includes at least one support roller resting against one wall portion of said guide track and at least one running roller engaged with the other wall portion of said track.

4. A multi-step entry, according to claim 3, wherein there are at least two pairs of rollers each pair including at least one running roller and one support roller.

5. A multi-step entry, according to claim 1, wherein said means for raising and lowering said track comprises a fluid pressure operated cylinder having a piston rod movable therein connected to said movable step.

6. A multi-step entry, according to claim 5, including a linkage connected between said piston rod and said step.

7. A multi-step entry, according to claim 6, wherein said linkage comprises a rotatable shaft connected to said piston rod for rotation thereby, a first link carried on said rotatable shaft and rotatable therewith, a second link pivotally connected to the outer end of said first link and pivoted at its opposite end to said step.

8. A multi-step entry particularly for rail vehicles having a fixed outer step lower than the entrance floor of the vehicle, comprising a movable step having a top normally horizontal platform portion and an obliquely extending guide portion, guide means associated with the entry extending obliquely alongside said guide portion engageable with said guide portion for guiding said step between an upper position at which said platform is level with said floor and a lower position between said floor and said fixed step, and means connected to said movable step for moving said movable step upwardly and downwardly between the floor and the outer fixed step, a railway car having an entrance way with a side wall at each end, said guide means comprising a guide track on each of said side walls extending obliquely downwardly and upwardly from said floor toward and extending substantially parallel to said guide portion of said step, said guide track includes first and second walls disposed at an angle to each other, said guide portion having at least one running roller and at least one support roller, a support arm pivoted on said guide portion and carrying said support roller, an adjustment means engageable with said arm for presetting said support roller against one of said walls of said walls of said guide track, said guide running roller being engaged with the other of said walls of said guide track.

9. A multi-step entry particularly for rail vehicles having a fixed outer step lower than the entrance floor of the vehicle, comprising a movable step having a top normally horizontal platform portion and an obliquely extending guide portion, guide means associated with the entry extending obliquely alongside said guide portion engageable with said guide portion for guiding said step between an upper position at which said platform is level with said floor and a lower position between said floor and said fixed step, and means connected to said movable step for moving said movable step upwardly and downwardly between the floor and the outer fixed step, said means for raising and lowering said track comprises a fluid pressure operated cylinder having a piston rod movable therein connected to said movable step, a linkage connected between said piston rod and said step, said linkage comprises first and second link members connected to said step platform portion at spaced locations and depending downwardly therefrom, first and second crank arm members pivotally connected to said walls and having ends connected to said first and second link members respectively, and a steerer crank arm connected to the opposite ends of said crank levers and connected to said fluid pressure operated piston rod.

10. A multi-step entry particularly for rail vehicles having a fixed outer step lower than the entrance floor of the vehicle, comprising a movable step having a top normally horizontal platform portion and an obliquely extending guide portion, guide means associated with the entry extending obliquely alongside said guide portion engageable with said guide portion for guiding said step between an upper position at which said platform is level with said floor and a lower position between said floor and said fixed step, and means connected to said movable step for moving said movable step upwardly and downwardly between the floor and the outer fixed step, an apron pivotally connected to the forward end of said step platform and depending downwardly therefrom to close the space below said platform, and apron guide means associated with said apron for guiding said apron inwardly and outwardly during downward and upward movement of said step.

11. A multi-step entry, according to claim 10, including spring means connected between said platform and said apron to urge said apron outwardly.

12. A multi-step entry particularly for rail vehicles having a fixed outer step lower than the entrance floor of the vehicle, comprising a movable step having a top normally horizontal platform portion and an obliquely extending guide portion, guide means associated with the entry extending obliquely alongside said guide portion engageable with said guide portion for guiding said step between an upper position at which said platform is level with said floor and a lower position between said floor and said fixed step, and means connected to said movable step for moving said movable step upwardly and downwardly between the floor and the outer fixed step, including a vehicle having a cut out portion with a bottom wall extending inwardly from said fixed step and an inclined rear wall extending upwardly from said bottom to said floor said cut out portion of said vehicle including a side wall end of said cut out portion, said step platform including an apron at the front thereof depending downwardly therefrom, said step platform with said apron closing the space below interiorly of said step and said apron between said fixed step and said rear wall and said movable step and said bottom.

* * * * *